(12) United States Patent
Mignot (10) Patent No.: US 9,124,443 B2
(45) Date of Patent: Sep. 1, 2015

(54) COMMUNICATION OF COMMANDS IN A HOME AUTOMATION NETWORK AND BETWEEN HOME AUTOMATION NETWORKS

(75) Inventor: Pierre Mignot, Châteauroux les Alpes (FR)

(73) Assignee: SOMFY SAS, Cluses (FR)

( * ) Notice: Subject to any disclaimer, the term of this patent is extended or adjusted under 35 U.S.C. 154(b) by 681 days.

(21) Appl. No.: 13/505,822

(22) PCT Filed: Jul. 22, 2010

(86) PCT No.: PCT/IB2010/053344
§ 371 (c)(1),
(2), (4) Date: Jun. 25, 2012

(87) PCT Pub. No.: WO2011/055239
PCT Pub. Date: May 12, 2011

(65) Prior Publication Data
US 2012/0262268 A1 Oct. 18, 2012

(30) Foreign Application Priority Data
Nov. 6, 2009 (FR) ...................................... 09 57889

(51) Int. Cl.
*G06F 9/54* (2006.01)
*H04L 12/28* (2006.01)
(Continued)

(52) U.S. Cl.
CPC .............. *H04L 12/282* (2013.01); *G06F 9/541* (2013.01); *H04L 12/2803* (2013.01);
(Continued)

(58) Field of Classification Search
CPC ... Y04S 20/227; Y04S 20/228; Y04S 20/242; Y02B 70/3241; Y02B 70/325; Y02B 70/3266; G05B 2219/25011; H04L 12/2803; H04L 12/2814; H04L 12/282; H04L 12/2836; H04L 2012/285; H04L 67/125; H04L 69/08
USPC .............. 710/106; 700/56, 275; 340/3.1, 4.32
See application file for complete search history.

(56) References Cited

U.S. PATENT DOCUMENTS 7,304,950 B2 12/2007 Dybsetter et al.
7,870,232 B2 1/2011 Reckamp et al.
(Continued)

FOREIGN PATENT DOCUMENTS

CN 1969480 A 5/2007
FR 2 939 555 A 6/2010
WO WO 01/78307 A 10/2001

OTHER PUBLICATIONS

Alan F. Blackwell and Rob Hague; "Designing a Programming Language for Home Automation"; 13th Workshop of the Psychology of Programming Interest Group; Proc. PPIG 13; pp. 85-103; Bournemouth, UK; Apr. 2001.

(Continued)

*Primary Examiner* — Glenn A Auve
(74) *Attorney, Agent, or Firm* — Frommer Lawrence & Haug LLP (57) ABSTRACT

Method of communication in a home automation network allowing communication between command transmitters and/or command receivers associated with equipment in a building by means of messages transmitted in the form of frames, a frame comprising at least one data field comprising several functional segments, said method comprising a step of constructing a frame on the basis of an instruction written in a programming language, the instruction comprising words composed in the form of strings of alphanumeric characters and/or of signs and/or of icons, delimited by separators, in which each word gives rise to a functional segment.

16 Claims, 4 Drawing Sheets

(51) Int. Cl.
*H04L 29/08* (2006.01)
*H04L 29/06* (2006.01)

(52) U.S. Cl.
CPC ....... *H04L 12/2814* (2013.01); *H04L 12/2836* (2013.01); *H04L 67/125* (2013.01); *H04L 69/08* (2013.01); *H04L 2012/285* (2013.01); *Y04S 20/228* (2013.01)

(56) References Cited

U.S. PATENT DOCUMENTS

| | | | |
|---|---|---|---|
| 8,189,620 B2 | 5/2012 | Duval et al. | |
| 8,380,359 B2 | 2/2013 | Duchene et al. | |
| 8,477,010 B2 | 7/2013 | Cheron et al. | |
| 2004/0138786 A1 | 7/2004 | Blackett et al. | |
| 2005/0271072 A1 | 12/2005 | Anderson et al. | |
| 2010/0121968 A1* | 5/2010 | Clark | 709/230 |
| 2010/0146423 A1 | 6/2010 | Duchene et al. | |
| 2010/0321151 A1 | 12/2010 | Matsuura et al. | |
| 2011/0194519 A1 | 8/2011 | Habetha | |
| 2012/0262268 A1 | 10/2012 | Mignot | |
| 2012/0262628 A1 | 10/2012 | Wilson et al. | |

OTHER PUBLICATIONS

Office action issued by Chinese Patent Office for corresponding Chinese application 201080049936.3 dated Jun. 5, 2014. English translation only.

* cited by examiner

| Downlink message | | Uplink message | |
|---|---|---|---|
| Actor 1 | Command transmitter | Actor 1 | Command receiver |
| Actor 2 | Command receiver | Actor 2 | Command transmitter |
| Sign | >> | Sign | << |

Fig. 5

| Sign | Transaction type or action type |
|---|---|
| = | Acknowledgement, assignment ("does"), equality |
| ? | Questioning, return request |
| # | Nonacknowledgement/negation ("does not to do") |
| & | With acknowledgement request |
| > | Stays greater than, if greater than |
| < | Stays less than, if less than |
| + | With insertion request, add, addition |
| - | With deletion request, subtraction |
| ( ) | Value or logic condition or recipient |
| sp | Segment separator, segment separator |

COMMUNICATION OF COMMANDS IN A HOME AUTOMATION NETWORK AND BETWEEN HOME AUTOMATION NETWORKS

This application is a 371 of PCT/IB2010/053344 filed on Jul. 22, 2010, published on May 12, 2011 under publication number WO 2011/055239, which claims priority benefits from French Patent Application Number 09 57889 filed Nov. 6, 2009, the disclosure of which is incorporated herein by reference.

The invention relates to a method for communicating information and controls over a home-automation network. The invention also relates to the devices allowing or using the communication method and an installation furnished with such devices.

A home-automation installation comprises at least two items of equipment in a building, which may communicate with one another through signals of the radiofrequency type or powerline communication type. These items of equipment may be controllers, motor controls, control members furnished with a man-machine interface, presence sensors, weather sensors, air-quality sensors etc., actuators connected to movable or fixed items of equipment such as doors or gates, ventilation flaps, sun protections, heating radiators, air conditioners, alarm sirens, etc. The items of equipment may also comprise home domestic appliances (for example electrical appliances or hi-fi).

Associated with the home-automation installation is a home-automation network and a communication protocol defining, according to a multi-layer standard model, the physical and logical modalities of transmitting the information in the home-automation installation. At the highest level, the items of equipment are usually defined by profiles explaining all of the controls or items of information originating from the item of equipment or recognized by the latter.

Each item of equipment is identified by an identification code, also called an equipment address in the installation.

Many communication protocols have been developed in this field, but they are incompatible with one another, even when they operate on identical communication frequencies, notably because of different frame structures (low-level) but also because of the semantics (high-level) used in the application layers. Moreover, within one and the same protocol, the low-level frame structure is decorrelated from the message (the instruction) as expressed in programming language. The result of this is a complexity which puts a strain on development times and on risks of error.

It is known practice to adapt the frame length and/or its content to the nature of an instruction contained in the frame, according to several formats. This type of adaptation is comparable for example to the encoding of the instructions of a microprocessor in assembler language: the number of bytes of the instruction depends on the nature of the instruction (executable without parameter, executable with one parameter, with two parameters etc.), of the addressing mode used (without address, relative addressing, extended addressing etc.) etc.

U.S. Pat. No. 7,304,950 describes a frame structure that can vary depending on the nature of the operation encoded in the frame. For example, an operation code 001 describes a write operation, using an extended field, with cyclic redundancy check (CRC) and acknowledgement. An operation code 010 describes the same operation but with no extended field, no CRC and no acknowledgement. There is no logical link in the encoding between the code of the operation and the code of presence of CRC or of acknowledgement.

It is known from patent application FR 2 939 555 to use a graphical user interface and icons for making it easier to program items of home-automation equipment, for example with the aid of a touch screen. An icon can be associated with a text window making it possible to fully identify an item of equipment from the icon and from its text window. Icons of complex type may represent not only an item of equipment but also the status of this item of equipment, which can be modified with the aid of buttons in a command window. This document does not encourage a particular communication method.

The invention makes it possible to remedy these various drawbacks by proposing a greater level of abstraction than that of the current protocols, and is therefore capable of federating them in a common language or of making the communication easier in gateways between protocols, easily comprehensible by humans, notably the programmer, by being much closer to the machine. The application of the invention requires a particular encoding of functional segments forming the frame.

The invention therefore has all its meaning in the context of a first programming of a home-automation installation, by simplifying the task of the installer. It is also very advantageously applicable within one or several home-automation installations, in which it provides a simplification of the interfacing with the user and a gateway between the home-automation installations.

According to the invention, the method of communication in a home-automation network allowing communication between actors consisting of command transmitters and/or command receivers associated with items of equipment in a building by means of messages transmitted in the form of frames, a frame comprising several functional segments, comprises a step of constructing a frame based on an instruction written in a programming language, the instruction comprising words made up in the form of alphanumeric character strings and/or of signs and/or of icons, delimited by separators, in which each word gives rise to a functional segment.

According to the invention, the communication method may comprise a step of constructing an instruction based on a frame in which each functional segment of the frame is converted into a word consisting of a string of alphanumeric characters and/or signs and/or of icons, with insertion of a separator between each word.

According to the invention, at least one of the functional segments may be assigned to an address, at least one of the functional segments may be assigned to an action code and/or at least one of the functional segments may be assigned to a parameter.

According to the invention, said separators may be spaces.

According to the invention, at least one of said functional segments may be a particular functional segment and said particular functional segment may specify a type of transaction or a type of action.

According to the invention, said particular functional segment may be formed from a string comprising only signs.

According to the invention, one and the same sign may have a different meaning if it specifies a type of transaction or if it specifies a type of action.

According to the invention, a first type of transaction may be an transaction of downlink type, if the message is transmitted from a command transmitter to a command receiver, and a second type of transaction may be an transaction of uplink type, if the message is transmitted from a command receiver to a command transmitter.

According to the invention, a type of transaction may include an acknowledgement request or a response to an acknowledgement request.

According to the invention, the types of action may comprise an action of assignment and/or an action of imposition and/or an action of interrogation.

According to the invention, in a frame, said particular functional segments may relate to an actor and/or to a parameter, notably a position or a speed of movement of an item of equipment and/or to a logical condition, based notably on a measured value of a parameter that can be measured by a sensor, and/or to a parameter value, each being assigned into distinct functional segments of said frame.

According to the invention, the translation device for the programming of a home-automation installation, said installation comprising command transmitters and/or command receivers associated with items of equipment in a building, said command transmitters and/or command receivers communicating with one another by means of frames comprising several functional segments, comprises means for translating into a frame an instruction written in a programming language, the instruction comprising words consisting of strings of alphanumeric characters and/or signs and/or of icons, delimited by separators, the structure of said translated frame corresponding to that of the instruction and comprising the same number of functional segments as the instruction comprises words.

According to the invention, the home-automation device of a type being a command transmitter and/or command receiver and/or home-automation installation programming tool, comprises hardware and software means and communication means capable of emitting and of receiving frames, said frames comprising a plurality of functional segments, and the hardware and software means comprise a frame memory making it possible to store a frame, a plurality of tables, a comparator capable of recognizing in said frame a segment-type code, said segment-type codes being stored in a first table, and of deducing from this particular code the type of each functional segment, in order to apply the communication method as described above.

According to the invention, the hardware and software means may comprise a second table of pointers storing the positions of said functional segments of a frame stored in said frame memory, said positions being determined based on an item of information of functional-segment length, said item of information being contained in a length field of one of said functional segments or deduced from the fact that one of said functional segments is a particular functional segment.

According to the invention, the home-automation installation comprises at least one translation device as described above or at least one home-automation device as described above.

Figure 1:
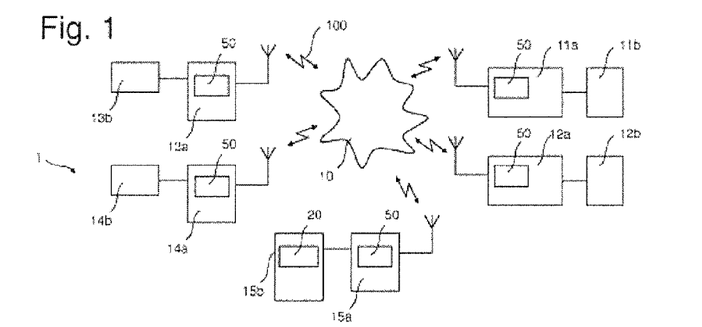
FIG. 1 represents a home-automation installation comprising several home-automation devices using the communication method of the invention to communicate.

The invention will be better understood by those skilled in the art by virtue of the detailed description of various embodiments with reference to the accompanying drawings, in which:

FIG. 1 represents a home-automation installation 1 comprising several home-automation devices communicating with the aid of a home-automation network 10.

These home-automation devices consist of command transmitters and/or of command receivers associated with items of equipment of a building or used for controlling such items of equipment.

Therefore, a first command receiver 11a is connected to a first item of equipment 11b, for example an actuator of a movable screen such as a roller blind or a sun protection.

A second command receiver 12a is connected to a second item of equipment 12b, for example an actuator of lighting, of heating or of air conditioning. A first command transmitter 13a is connected to a third item of equipment 13b, for example a controller comprising a control keyboard and a display screen contained in a remote control housing, thus forming a remote control. A second command transmitter 14a is connected to a fourth item of equipment 14b, for example a sensor of indoor or outdoor temperature, a presence sensor, a sunlight sensor or a wind sensor.

A third command transmitter 15a is connected to a programming tool 15b designed to communicate with the various items of network equipment. This programming tool may for example be, like the third item of equipment, an advanced controller, but it may also consist of a computer (PDA, PC, etc.).

The command transmitters and/or command receivers communicate with one another with the aid of a home-automation network 10 using for example a physical medium of the radiofrequencies type as shown in the figure by the antenna symbol, or of the direct wire type, or else of the powerline communication (PLC) type. The home-automation network may also combine the various types of physical medium in the case of a heterogeneous network.

The messages (or "telegrams") are transmitted in the form of signals comprising emitted or received frames 100. The home-automation network according to the invention uses a communication protocol specifying notably the method for converting frames into signals transmitted over the home-automation network.

The communication between elements is bidirectional. The term "command transmitter" or "command receiver" designates by convention the main direction of communication of commands or of data between the various devices. Alternatively, certain devices are unidirectional, such as local, short-range remote controls. A device associated with a sensor is similar to a command transmitter. Such a device may emit information only. Command transmitters and command receivers are "actors" in the communication method. Each actor is identified by an identifier that is specific to it, for example an address in the home-automation network.

Each item of equipment furnished with a man-machine interface (even simple or guided: keyboard, screen) may allow the translation of a human action into an instruction for controlling or for programming an associated item of equipment. This translation involves a conversion of the information that is input (pressing on a keyboard key, choosing from a screen menu) into a control or programming frame that can be understood by the associated item of equipment, according to the shared communication protocol.

On the other hand, the steps of programming the installation are usually more awkward and often require time and/or a good knowledge by the installer of the operation of the elements belonging to the installation to be programmed.

Figure 2:
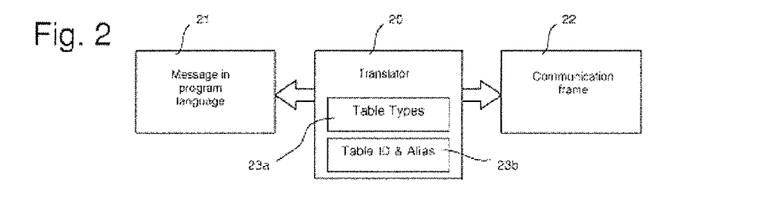
FIG. 2 represents schematically a translation device according to the invention.

FIG. 2 represents schematically a translation device 20 according to the invention. Such a translation device may be incorporated into a remote control or a programming tool that an installer has. It may also form part of a relay box, or gateway, providing the communication between two distinct home-automation installations. This translation device allows the translation of an instruction or of a message from a programming language used by a human programmer into a communication frame capable of operating home-automation devices. Conversely, the translation device may also be capable of carrying out the inverse translation. As will be seen below, the invention is not limited to the device and to the translation method, and allows the direct communication between the items of equipment with the aid of frames defined according to the invention.

In a programming language of the text type, the message forming the instruction takes the form of a string of alphanumeric characters and/or of signs that can be read and understood by humans.

In a manner that is more programmer-friendly, the message forming the instruction may also be built up by an appropriate choice of pictograms, of buttons or of icons presented in a contextual manner on a graphical user interface (GUI). Each choice of pictogram, of button or of icon is a substitute for the writing of a character string representative of the pictogram, of the button or of the icon. The translation device is then capable of converting directly the choice of the pictogram, of the button or of the icon into an element, called a functional segment, of a communication frame.

The translation device thus ensures that the instruction or the message 21 is converted into a frame 22 that can be understood by the machine or vice versa. The frame comprises a data field which comprises several functional segments resulting from the instruction.

The frame is converted according to the communication protocol that can be understood by the item of home-automation equipment to which it is sent. It is known practice to add a preamble and control fields to the frame, but no account is taken thereof here, and the same applies to the possible encryption operations. These points will be specified in connection with FIGS. 15A and 15B.

According to the invention, the data field of the frame retains the structure of the instruction, the latter being in the form of programming language, consisting of strings of alphanumeric characters and/or signs, delimited by separators (for example spaces). The instruction takes the form of words composed of a string of alphanumeric characters and/or signs delimited by separators. The instruction can be read and understood by humans, so it corresponds to a programming language that can be called textual. Each string gives rise to a functional segment of the frame. This is valid whether the instruction is of the simple type (single instruction) or of the multiple type (sequence of several single instructions), as explained in detail below.

Alternatively, in a programming language of the icon type, the instruction results from a plurality of successive choices of pictograms, buttons or icons on the graphical user interface, each of the choices being equivalent to the writing of a textual word and of a separator, and forming a segment of the instruction. In this case, the instruction takes the form of words composed in the form of icons, an icon being a substitute for a word written in the form of a character string.

The instruction may also contain a portion of instruction in icon form and a portion of instruction in textual form.

The translation device uses a library of mapping tables for mapping between the possibilities offered by all the network elements (items of equipment, controllers, sensors, etc.) and their reference. The translation of the textual instruction comprising the strings of alphanumeric characters and/or of signs is then carried out by the replacement of each segment of the instruction by its binary correspondent. Thus, the translator comprises for example a table of types 23a and a table of identifiers (ID), of parameters and of aliases 23b, the use of which will be specified below with reference to FIG. 12.

The same applies to each segment in the case of an instruction written in a programming language of icon type or linking icon and textual writing choices.

Irrespective of the direction of translation, the translator 20 complies with the syntax or structure of the instruction and of the corresponding frame.

The choice of a library can therefore offer a "multilingual" programming language, the choice of the language (English, French, etc.) desired by the installer for the programming language being made by choosing an appropriate library.

Figure 3:
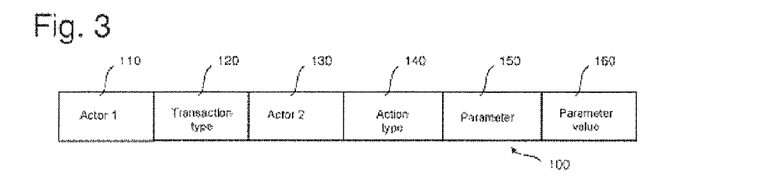
FIG. 3 represents, according to the invention, the structure of a communication frame and/or of an instruction in the programming language.

FIG. 3 represents the structure of the data field of a communication frame 100 and/or of an instruction in the programming language. This structure is the same whether the elements are considered before or after translation. Thus, the functional segments of the frame correspond to the words of the instruction from which it is translated. This notation (words, functional segments) is used in the rest of the description without distinction for a frame or an instruction:

Therefore whether it be in programming language or in the form of machine code (binary), the instruction and/or the corresponding frame comprise at least:
  a first identification functional segment 110 of a first actor Actor1,
  an transaction-type functional segment 120,
  a second identification functional segment 130 of a second actor Actor2,
  an action-type functional segment 140,
  a parameter functional segment 150,
  a parameter value functional segment 160.

As will be seen below, the functional words or segments can be repeated several times, with different contents, in the case of complex instructions. As will be seen below, a parameter value functional segment may also contain a logical condition relating to the parameter. An instruction may therefore comprise as many words as desired. In particular, the frame reproducing the instruction may comprise more than two functional segments identifying actors, and may comprise more than one functional segment of the action type. These various functional segments are not positioned a priori in the frame: their position results from the content of the instruction.

Figure 4:
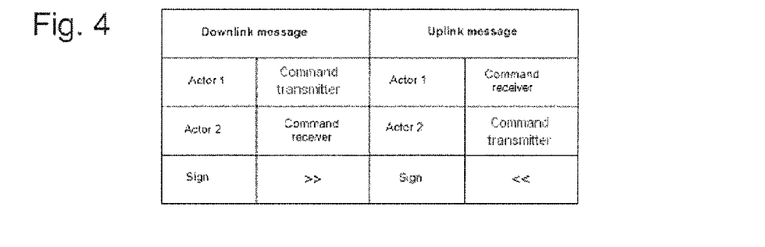
FIG. 4 represents two types of transactions identified in the invention.

FIG. 4 represents two types of transactions identified in the invention.

In a message of the downlink type, the first actor is a command transmitter and the second actor is a command receiver. The functional segment of the transaction type indicates unambiguously the direction of the transaction, from the command transmitter to the command receiver. According to the invention, the actors are preferably identified in the programming language by alphanumeric strings: for example Remotecontrol2, LivingroomThermostat, RollerBlind3, while the type of transaction is preferably identified by a string of signs (or at least by a selection of particular signs) from the character set that can be accessed on the keyboard of a programming tool. The string of signs comprises one or more signs, as representative as possible for the human reader.

Thus, the transaction type corresponding to a downlink message is represented by the signs >>, while the transaction type corresponding to an uplink message is represented by the signs <<.

However, the person writing the program is free to reverse the position of the actors in his instruction provided that he also reverses the sign of the transaction type.

The invention does not make it obligatory always to consider a command transmitter as the first actor and a command receiver as the second actor, since the transaction type indicates unambiguously the respective roles during the transaction. It is however the preferred embodiment.

In the case of transactions between command transmitters and if there is a hierarchical relationship between the latter, it is preferable to use the command transmitter of the highest hierarchical rank as the first actor.

These are indeed, in both cases, ways of programming that are left to the judgment of the programmer. Similarly, the invention does not make it obligatory to specify the type of transaction if a convention is taken in the programming language: for example to always consider the transmitter of the current message to be the first actor and the recipient of the message to be the second actor. However, it will appear clearly in reading the examples that follow that it is worthwhile allowing this specification of the transaction type.

Figure 5:
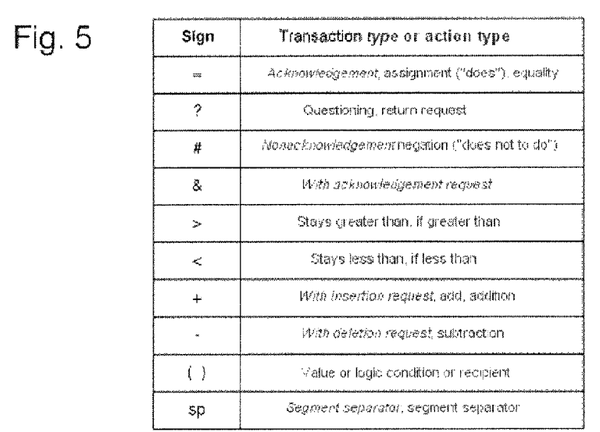
FIG. 5 represents various signs used in the programming language and their meaning.

FIG. 5 represents a table of other signs used in the programming language and their meaning.

These signs are used in the particular functional segments of transaction type 120 and of action type 140, and they constitute, on their own or in association with other signs, the content of these particular functional segments. Certain signs may also be used at the beginning of functional segments of parameter values.

Thus, the sign "=" has the conventional meaning of assignment or of imposition of equality to be observed if it is present in the functional segment of action type, while it has the meaning of acknowledgement if it is present in the functional segment of transaction type. The sign "=" has the meaning of logical condition if it is placed in a segment of parameter value.

Conversely, the sign "#" has the meaning of "does not do" if it is present in the functional segment of action type, while it has the meaning of nonacknowledgement if it is present in the functional segment of transaction type. It has the meaning "different from" in a functional segment of parameter value, representing a logical condition.

The sign "?" has the meaning of questioning when it is present in the functional segment of action type.

The sign "&" has the meaning of an acknowledgement request when it is present in the functional segment of transaction type. The positive acknowledgement means that the message is indeed received and will be processed.

The signs ">" and "<" have the meaning of imposition of inequality to be observed when they are present in the functional segment of action type or the meaning of logical conditions "if greater than" or "if smaller than" when they are present in a segment of parameter value.

The sign "+" corresponds to an insertion (or concatenation or chaining) request when it is included in the transaction type, which will be described with reference to FIG. 9. It has the conventional meaning of addition when it is included in a functional segment of action type, as will be described with reference to FIG. 10.

The sign "−" corresponds to a deletion request when it is included in the transaction type, which will be described with reference to FIG. 9.

The sign ( ) is for identifying a segment of parameter value (or of logical condition relating to a parameter value) contained inside the parentheses.

The case of the sign "sp" will be described below with respect to FIG. 12.

Figure 6:
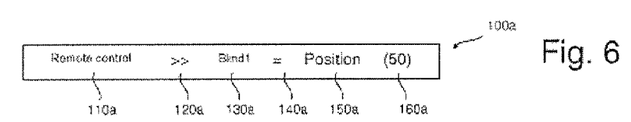
FIG. 6 represents a first example of a frame and/or of an instruction.

FIG. 6 represents a first example of a frame 100a and/or of an instruction.

In programming language, the instruction reads:

Remotecontrol1>>Blind1=Position (50).

The spaces separate the various portions of the instruction.

The two actors "Remotecontrol" and "Blind1" are clearly identified by the alphanumeric strings. The message is of the downlink type, from a command transmitter "Remotecontrol" to a command receiver "Blind1". The action is a positioning request comprising an imposition of equality, relating to the parameter "position" that the value 50 (or 50%, according to an interpretation set by the Profile document of the blind) must take.

This same structure is again found in the binary-encoded frame. Naturally, "Remotecontrol" and "Blind1" are replaced in the functional segments 110a and 130a of the frame by the corresponding address codes in the installation. This relationship is established by use of the table of identifiers, parameters and aliases, 23b. Similarly, the segments of transaction type 120a, of action type 140a and of parameter 150a take in the frame particular codes in a one-to-one relationship with their content in programming language. This relationship is established by use of the table of Types 23a.

Figure 7:
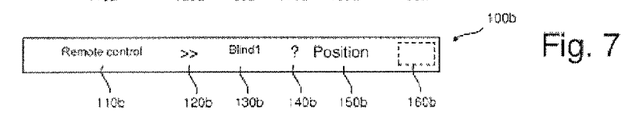
FIG. 7 represents a second example of a frame and/or of an instruction.

FIG. 7 represents a second example of a frame 100b and/or of an instruction.

In programming language, the instruction reads:

Remotecontrol>>Blind1?Position.

The two actors "Remotecontrol" and "Blind1" are the same as before. The message is again of the downlink type. The action is an interrogation relating to the position parameter.

The parameter value no longer appears either in the instruction or in the corresponding frame.

A response to the transmission of this message would be for example, if Blind1 is in a completely deployed position (100%)

Remotecontrol<<Blind1=Position (100).

Figure 8:
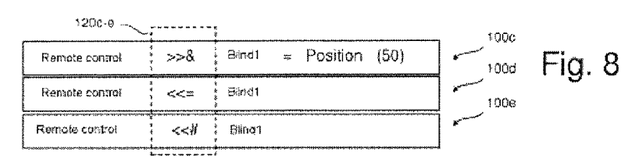
FIG. 8 represents three examples of frames and/or of instructions relating to one and the same sequence.

FIG. 8 represents three other examples of frames and/or of instructions relating to one and the same sequence.

In a first case or third example, the instruction in programming language reads:

Remotecontrol>>& Blind1=Position (50).

This is therefore the same case as in FIG. 6, but this time the type of transaction is accompanied by an acknowledgement request. Depending on whether or not Blind1 accepts to take account of the command for positioning at 50%, the acknowledgement may or may not be positive.

In the corresponding frame, the segment of transaction type 120c therefore contains a code representing this additional acknowledgement request.

A second case or fourth example is that of a response by positive acknowledgement:

Remotecontrol<<=Blind1.

The frame 100d is therefore limited to the first three functional segments. The second functional segment 120d therefore contains a code representing the acceptance of the command.

A third case or fifth example is that of a response by negative acknowledgement:

Remotecontrol<<#Blind1.

The frame 100e is again limited to the first three functional segments. The second functional segment 120e therefore contains a code representing the rejection of the command. It is also possible to add an item of information indicating the cause of the rejection.

Figure 9:
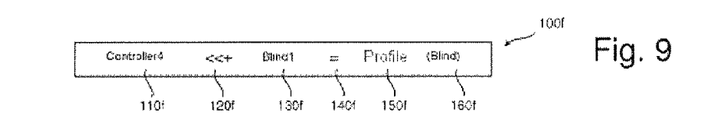
FIG. 9 represents a sixth example of a frame and/or of an instruction.

FIG. 9 represents a sixth example of a frame and/or of an instruction.

In programming language, the instruction reads:

Controller4<<+Blind1=Profile (Blind).

It is therefore an uplink message emitted by Blind1 which requests to be added to the list of the known identifiers of Controller4 and to assign thereto the generic profile Blind.

The generic profile Blind tells a command transmitter which are the commands recognized by the home-automation device of the Blind type.

Conversely, a request for removal from this list is written simply:

Controller4<<−Blind1.

Because of the meaning of addition of the sign + in a functional segment of action, the invention makes it possible to combine several actions in one and the same message, by repetition of the last two or three functional segments of the frame. For example, for a command for a rapid winding up of a blind following a detection of wind:

WindSensor>>Blind2=Position (0)+Speed (Rapid).

Figure 10:
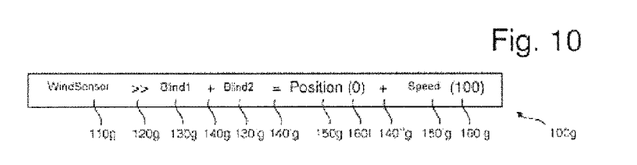
FIG. 10 represents a seventh example of a frame and/or of an instruction.

In the same way, it is possible to repeat more than twice a functional segment of an actor within the frame. FIG. 10 thus gives the example of a frame 100g combining several recipient actors and several actions to be undertaken.

In programming language, the message is written:

WindSensor>>Blind1+Blind2−Position (0)+Speed (100).

This frame 100g therefore comprises 3 functional segments each designating an actor and 3 functional segments designating a type of action: indicating an action of addition for two of them (+) and an action of imposition for the third (=).

The invention also makes it easier to write and use aliases, for example, initially during the configuration in programming language:

CentralController<<+Blinds=Blind1+Blind2.

This instruction adds to the table of identifiers of Central-Controller the alias "Blinds" to represent the identifiers of Blind1 and Blind2.

With the aid of the sign −, it is possible to exclude certain members of a group represented by an alias for the execution of an instruction:

Remotecontrol>>BlindGroup−Blind1=Position (10)

means for example that all the members of the group defined by BlindGroup, with the exception of Blind1, must be deployed to 10%.

Figure 11:
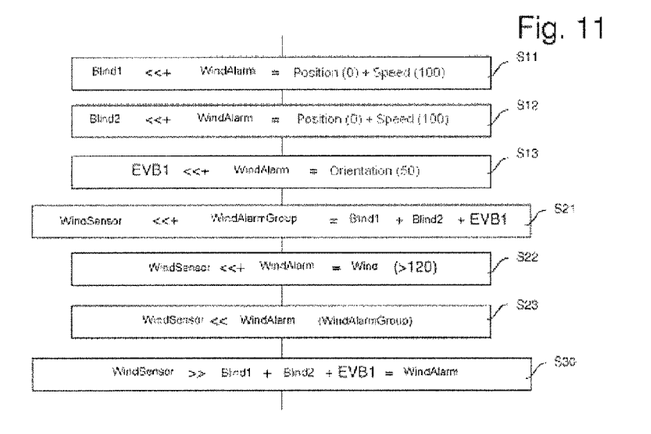
FIG. 11 represents a sequence of frames and/or of instructions relating to a method for detecting wind.

FIG. 11 represents, as an illustration, a sequence of frames and/or of instructions relating to a method for detecting wind.

In a first step S11, an alias "WindAlarm" is assigned to Blind1, with the corresponding action being to assign the value 0 to the parameter Position and the value 100 to the parameter Speed, namely an action of high-speed folding up.

In a second step S12, the same assignment message is sent to Blind2. In a third step S13, the alias "WindAlarm" is also assigned to EVB1, but this time the content is different since the value 50 is assigned to the parameter Orientation.

EVB1 is for example a blind with orientable slats (External Venetian Blind). In the event of wind, it may be sufficient to set the slats to the horizontal (namely an orientation of 50%) to protect the item of equipment.

In a fourth step S21, the alias "WindAlarmGroup" is assigned to a wind sensor designated by WindSensor by assigning to it the value Blind1+Blind2 EVB1. A group of actuators is thus defined in the wind sensor.

In a fifth step S22, a wind alarm condition is created. The instruction is written (like the corresponding frame):

WindSensor<<+WindAlarm=Wind (>120).

In this instruction, Wind is an attribute of the wind sensor, which is therefore already known to it (and indicated in a profile of the wind sensor). The condition WindAlarm is fulfilled if the parameter Wind (measured by the sensor) is greater than 120 km/h.

In a sixth step S23, a value is assigned to the alias WindAlarm. In the case of an event alias such as WindAlarm, a value is a recipient concerned by the event.

The instruction is written:

WindSensor<<WindAlarm (WindAlarmGroup).

The first six steps are configuration steps which are carried out in any order and in a totally asynchronous manner, following programming with the aid of a supervisor. If now the measured wind exceeds the value of 120 km/h, then a message is emitted by the wind sensor, as described by the seventh step S30;

WindSensor>>Blind1+Blind2+EVB1=WindAlarm,

Each of the items of equipment Blind1, Blind2 and EVB1 detects that it is the recipient of the message and will apply the action of folding up or of orientation corresponding to WindAlarm.

The invention therefore makes it possible to greatly simplify the programming of instructions, the translation into communication frames of variable length and the interpretation of the frames or of the instructions.

The signs used in the description are given as a nonlimiting example and may give rise to many variants. For the reasons mentioned below, it is preferred to use only signs in the segments of the transaction type or of the action type, but it is not an obligation. For example, the sign "=" may be replaced by the character string "set" when it involves an assignment.

The sign "space" (marked "sp" to represent " ") is preferably used as a separator in the programming language.

The invention similarly applies in the case of programming language of the icon type. The creation of aliases is then made easier by operations of the "drag & drop" type in which the programmer selects for example an icon representative of an item of equipment and drags it to an alias icon in order to assign it to the latter. In the same way, instructions that are complete or for which only a parameter value must be completed may be assigned to icons.

In the case of complex icons (or dynamic icons) as described for example in FIGS. 4 and 5 of patent application FR 2 939 555, these icons represent items of equipment that can be modified by a control window as described in FIG. 6 of this document. For example, a Venetian blind appears in a simplified manner in the control window, in section or in a profile view, with an adjustment button for deployment and an adjustment button for orientation. By acting on the control buttons, it is possible to set a deployment of 50% and an orientation of 20° and thus modify the state of a complex icon. Selecting this complex icon is for example strictly equivalent to the textual writing of a portion of an instruction:

VenetianBlind2=Deployment (50)+Orientation (20).

A complex icon is therefore equivalent to a sequence of several words.

In any case, whether the program is of text or icon origin, the frame consists of functional segments as described.

Figure 12:
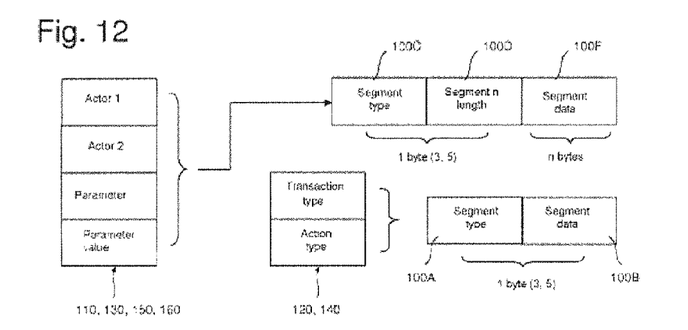
FIG. 12 represents the binary encoding of a frame emitted over the home-automation network.

FIG. 12 represents an example of binary encoding of a frame to be transmitted over the home-automation network.

Depending on the type of functional segments, the encoding is not the same. Particular functional segments such as a functional segment of transaction type 120 or of action type 140 are preferably encoded in the form of a single byte, while functional segments of identification (110, 130), of parameter (150) or of parameter value (160) are encoded on a variable number of bytes.

A field of segment type uses for example 3 bits of a first byte. As the invention is described, there are 6 different types of functional segments. The choice of 3 bits in the first byte makes it possible to encode each type of functional segment and optionally to subsequently identify two new types of functional segments. The 5 remaining bits are used to encode: either data of the segment, if it is a particular functional segment, or a length of the segment if it is a functional segment of identification, of parameter or of parameter value.

Thus, a particular functional segment specifying a type of transaction 120 or specifying a type of action 140 is encoded in the form of a first byte comprising a first field 100A of segment type (for example 010 for a type of transaction and 011 for a type of action) and a second field 100B for segment data, which contains (preferably of 5 bits) the code of the signs or characters specifying the transaction or the action. There are therefore preferably 32 codes that can be differentiated, which makes it possible to envisage codes for encoding in the first byte not only signs (as described in FIGS. 4 and 5) but also associations of signs that are frequently used (as described in FIGS. 8 and 9). Alternatively, it is possible to repeat the first byte with the same first field but with a different second field containing the code of additional signs.

A functional segment for identifying a first actor 110 or for identifying a second actor 130 or for specifying a parameter 150 or a parameter value 160 is encoded in the form of a second byte including a third field 100C encoding the type of segment (for example respectively 100, 101, 110 and 111) and a fourth field 100D encoding the length of the functional segment, followed by a plurality n of bytes forming a fifth field 100F containing the data of the functional segment. The length of the functional segment indicates for example the number n of bytes forming the fifth field (for example from 1 to 32).

With the aid of such encoding, various functional segments can be repeated in the frame if they translate an instruction of multiple type. Moreover, the translation supports several different protocols, for example to express an identifier in the form of an address: the number of address bytes usually varies from one protocol to another. According to the invention, the address is specifically encoded on a variable number of bytes, this number being specified in the frame.

Alternatively, in order to simplify the frame-processing algorithms, the "segment type" and "segment length" fields can each be encoded on a distinct byte. One loses inversely on the size of the frame. These sizes can be modified depending on the network put in place.

Similarly, the "transaction type" and "action type" fields are not necessarily special fields. In this case, which lends itself to the most usual situation, they take the same form as a functional segment of actor or parameter type with the three fields 100C, 100D and 100F.

An alias may similarly comprise not only a variable character length in programming language but also a variable number of bytes in binary code.

All the signs, or associations of signs and/or of alphanumeric characters (for example "=" or "set") are encoded in binary (for example on 5 bits) in the table of types 23a inside the translation tool. Similarly, the identifiers or aliases or parameters are encoded in binary in the table of identifiers or aliases 23b.

For example:
RemotecontrolBedroomFloor1
is encoded:
1F 23 C0 DC 58 55 00 00
if it is agreed that an address identifier or a parameter name is uniformly encoded on 64 bits (8 bytes), which indicates a value 8 of the number n in the fourth field 100D.

The direct selection on a screen of an icon representing the remote control for the bedroom on the 1$^{st}$ floor would give this same binary encoding in the case of a programming language of icon type, causing binary codes to correspond directly to icons or buttons. It is strictly equivalent, during programming, to select an icon or to write a word representative of said icon.

Similarly the parameter:
TemperatureParlorGroundfloor
is encoded:
00 00 00 E0 8F 00 24 15.

Figure 13:
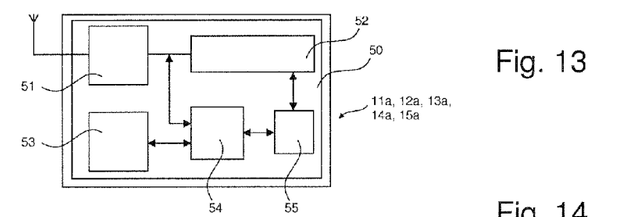
FIG. 13 represents a home-automation device furnished with means capable of applying the communication method according to the invention.

FIG. 13 represents a home-automation device of the command transmitter type 13a, 14a, 15a or of command receiver type 11a, 12a furnished with frame-analysis means capable of applying the communication method according to the invention.

A frame-analysis means 50 comprises a means 51 for communicating over the home-automation network, such as a radiofrequency transceiver capable of emitting and of receiving frames comprising a data field. The device comprises a frame memory 52, making it possible to store at least one frame, and a plurality of tables.

A first table 53 is used to store the particular codes of particular functional segments.

When the message is received, the particular codes contained in the frame are detected in order to identify the functional blocks. Accordingly, the device also comprises a comparator 54 capable of recognizing, in the data field, a particular code of segment type and of deducing from this particular code the type of functional segment.

The length of the functional segment is deduced either from the type of segment, if it is a particular functional segment, or from a field indicating the length of the segment. The device comprises a second table of pointers 55 in which the start and/or end positions of the various functional segments in the frame memory are stored. Thus, the processing of the functional segments is then carried out by processing means of the device, not shown.

The various elements of the device are functional blocks of which some may be implemented in software form. Advantageously, one and the same microcontroller contains all the elements of the device, and the analysis and processing means.

It is not necessary for all the command receivers and transmitters of the installation to have the translation device.

Figure 14:
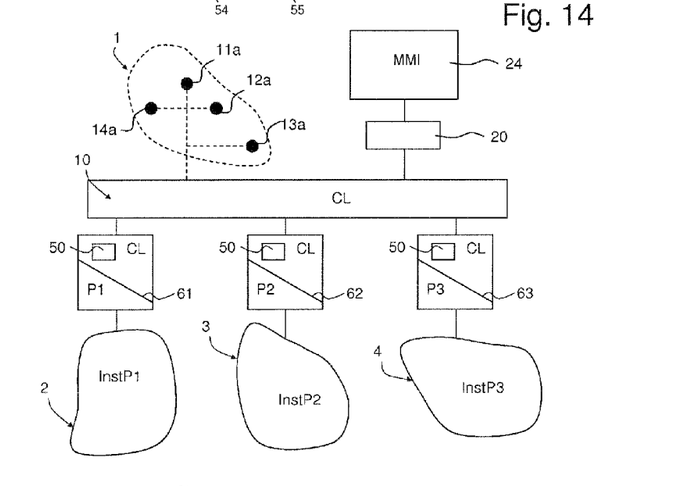
FIG. 14 represents an installation network comprising a home-automation device furnished with means capable of applying the communication method according to the invention.

Specifically, if the language described in the present application is used solely for programming and for operating an installation, only the home-automation devices having a man-machine interface that is sufficiently sophisticated can be fitted with the translation device. The latter is therefore used for translating into frames the legible instructions supplied by the installer or the user or for translating into legible language, for an installer or a user, the frames supplied by other items of equipment of the installation. This situation is shown in FIG. 1. All the home-automation devices are nevertheless fitted with a frame-analysis device 50 for analyzing a frame according to the invention in order to process it and execute the instruction (of single type or of multiple type) that it contains. If the language described in the present application is used for connecting together various installations using different protocols, all the home-automation devices can be fitted with a translation device. Alternatively, only gateways are fitted therewith. Thus, FIG. 14 shows a network of home-automation installations. In addition to the home-automation installation 1 of FIG. 1, the network of installations comprises three other home-automation installations 2 or InstP1, 3 or InstP2, 4 or InstP3, in which the home-automation devices communicate with one another according to respectively a protocol P1, P2, P3. Each of these other installations is connected to a gateway for translating the frames between the protocol of the installation and the protocol 10, also called: "common language" CL. A first gateway 61 provides the interface between the language of the protocol P1 and the common language CL, a second gateway 62, the interface between P2 and CL and a third gateway between P3 and CL. Each gateway comprises a frame-analysis device 50.

In order to program or control an item of equipment in one of the installations InstP1, InstP2, InstP3, the installer or user has a man-machine interface MMI 24, which operates in conjunction with the translation device 20 described above. Therefore, the installer has the option of using the very intuitive programming language based on signs and/or legible alphanumeric characters and/or icons, while communicating (in the form of commands or items of information) with items of equipment of very diverse installations, via the common language from which the frames are translated based on instructions in programming language.

Moreover, the command transmitters or command receivers of other items of equipment 11a, 12a, 13a, 14a can also be incorporated into this network of installations, the latter communicating directly with the rest of the installation network by using the common language CL. Alternatively, the common language is used only for a communication between the man-machine interface and the communication gateways, without any item of equipment being directly controlled with the aid of the common language.

The common language CL is therefore characterized by a binary syntax making it possible to construct a communication frame of totally variable complexity and faithfully reflecting, segment by segment, an instruction or a message of which the structure is not defined a priori.

This frame may be directly transmitted to the physical medium after addition of preamble or cyclic redundancy check (CRC) bytes. It may also be converted in a more or less complex manner according to the protocol used, and notably by encryption.

Figure 15A:
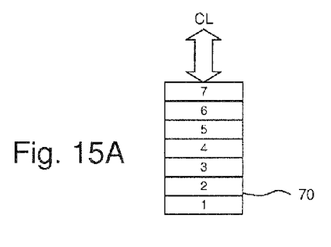
FIGS. 15A and 15B represent schematically two examples of application of the invention to the 7-layer OSI communication model.

As shown schematically in FIG. 15A, the communication frames of the common language CL may be applied or received in the "application" layer 7 of the OSI standard communication model, when a first home-automation protocol 70 uses all of the 7 layers. Then many items of information of the protocol 70, for example authentication or routing items, are added to the content of the communication frame according to the invention.

Figure 15B:
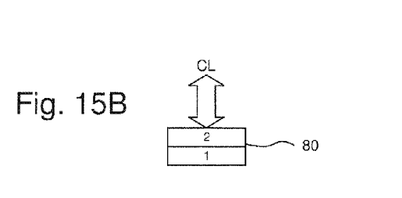

Conversely, as shown schematically in FIG. 15E, the common language CL may be applied directly to much lower layers of the OSI model, for example layer 2 "link" if a second home-automation protocol is satisfied with two layers, the communication frame according to the invention then being simply "encapsulated" by a preamble and a checksum.

The common language may also be called "Metalanguage" because of its ability to allow communication between networks or between items of equipment using the most varied home-automation protocols in a building, for example "Ipv6", "io-homecontrol*", "Zigbee*", "Z-wave*", etc.

(* registered trademarks).

The invention claimed is:

1. A method of communication in a home-automation network allowing communication between actors consisting of command transmitters and/or command receivers associated with items of equipment in a building by means of messages transmitted in the form of frames, a frame comprising several functional segments, wherein said method comprises a step of constructing a frame based on an instruction written in a programming language, the instruction comprising words made up in the form of alphanumeric character strings and/or of signs and/or of icons, delimited by separators, in which one functional segment is built for each word.

2. The communication method as claimed in claim 1, wherein it comprises a step of constructing an instruction based on a frame in which each functional segment of the frame is converted into a word consisting of a string of alphanumeric characters and/or signs and/or of icons, with insertion of a separator between each word.

3. The communication method as claimed in claim 1, wherein at least one of the functional segments is assigned to an address, at least one of the functional segments is assigned to an action code and/or at least one of the functional segments is assigned to a parameter.

4. The communication method as claimed in claim 1, wherein said separators are spaces.

5. The communication method as claimed in claim 1, wherein at least one of said functional segments is a particular functional segment and said particular functional segment specifies a type of transaction or a type of action.

6. The communication method as claimed in claim 5, wherein said particular functional segment is formed from a string comprising only signs.

7. The communication method as claimed in claim 5, wherein one of said signs has a different meaning if it specifies a type of transaction or if it specifies a type of action.

8. The communication method as claimed in claim 5, wherein a first type of transaction is a transaction of downlink type and a second type of transaction is a transaction of uplink type.

9. The communication method as claimed in claim 5, wherein a type of transaction includes an acknowledgement request or a response to an acknowledgement request.

10. The communication method as claimed in claim 5, wherein said type of action comprises an action of assignment and/or an action of imposition and/or an action of interrogation.

11. The communication method as claimed in claim 5, wherein, in a frame, said particular functional segment relates to an actor and/or to a parameter, notably a position or a speed of movement of an item of equipment and/or to a logical condition, based notably on a measured value of a parameter that can be measured by a sensor, and/or to a parameter value, each being assigned into distinct functional segments of said frame.

12. A home-automation device of a type being a command transmitter and/or command receiver and/or home-automation installation programming tool, comprising hardware and software means and communication means capable of emitting and of receiving frames, said frames comprising a plurality of functional segments, wherein the hardware and software means comprise a frame memory making it possible to store a frame, a plurality of tables, a comparator capable of recognizing in said frame one or more segment-type codes, said one or more segment-type codes being stored in a first table, and of deducing from said one or more segment-type codes the type of each functional segment, in order to apply the communication method as claimed in claim 1.

13. The home-automation device as claimed in claim 12, wherein the hardware and software means comprise a second table of pointers storing one or more positions of said functional segments of the frame stored in said frame memory, said one or more positions being determined based on an item of information of functional-segment length, said item of information being contained in a length field of one of said functional segments or deduced from the fact that one of said functional segments is a particular functional segment.

14. A home-automation installation comprising at least comprising at least one home-automation device as claimed in claim 12.

15. A translation device for the programming of a home-automation installation, said installation comprising command transmitters and/or command receivers associated with items of equipment in a building, said command transmitters and/or command receivers communicating with one another by means of frames comprising several functional segments, wherein said device comprises means for translating into a frame an instruction written in a programming language so as to obtain a translated frame, the instruction comprising words consisting of strings of alphanumeric characters and/or signs and/or of icons, delimited by separators, the structure of said translated frame corresponding to that of the instruction and comprising the same number of functional segments as the instruction comprises words.

16. A home-automation installation comprising at least one translation device as claimed in claim 15.

* * * * *